(12) United States Patent
Fukushima et al.

(10) Patent No.: US 8,653,173 B2
(45) Date of Patent: Feb. 18, 2014

(54) ELASTIC MEMBER FOR INK JET

(75) Inventors: Takashi Fukushima, Yokohama (JP);
Akihiko Shimomura, Yokohama (JP);
Toshihiko Ujita, Yokohama (JP);
Kyosuke Nagaoka, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 180 days.

(21) Appl. No.: 13/279,056

(22) Filed: Oct. 21, 2011

(65) Prior Publication Data

US 2012/0129997 A1 May 24, 2012

(30) Foreign Application Priority Data

Nov. 22, 2010 (JP) ................................. 2010-260185

(51) Int. Cl.
*C08K 5/06* (2006.01)

(52) U.S. Cl.
USPC .......................................... 524/376; 524/377

(58) Field of Classification Search
USPC .................................................. 524/376, 377
See application file for complete search history.

(56) References Cited

U.S. PATENT DOCUMENTS

| | | | |
|---|---|---|---|
| 4,430,468 A * | 2/1984 | Schumacher | ................. 524/109 |
| 4,689,640 A | 8/1987 | Shimomura | |
| 5,381,172 A | 1/1995 | Ujita et al. | |
| 5,451,992 A | 9/1995 | Shimomura et al. | |
| 5,510,818 A | 4/1996 | Shimomura et al. | |
| 5,650,805 A | 7/1997 | Shimomura et al. | |
| 5,663,752 A | 9/1997 | Imamura et al. | |
| 5,738,911 A | 4/1998 | Imamura et al. | |
| 5,980,026 A | 11/1999 | Imamura et al. | |
| 6,409,931 B1 | 6/2002 | Shimomura et al. | |
| 6,484,399 B2 | 11/2002 | Aono et al. | |
| 6,586,495 B1 | 7/2003 | Shimomura et al. | |
| 6,713,128 B2 | 3/2004 | Shimomura et al. | |
| 6,750,290 B2 | 6/2004 | Imamura et al. | |
| 6,846,520 B2 | 1/2005 | Shimomura et al. | |
| 6,869,541 B2 | 3/2005 | Shimomura et al. | |
| 7,824,020 B2 | 11/2010 | Saito et al. | |
| 2010/0305272 A1 | 12/2010 | Nagaoka et al. | |

FOREIGN PATENT DOCUMENTS

JP 2005-305878 A 11/2005

OTHER PUBLICATIONS

Nagaoka, et al., U.S. Appl. No. 13/279,034, filed Oct. 21, 2011.

* cited by examiner

*Primary Examiner* — Edward Cain
(74) *Attorney, Agent, or Firm* — Fitzpatrick, Cella, Harper and Scinto

(57) ABSTRACT

Provided is an elastic member for ink jet, including a styrene-based thermoplastic elastomer and a thermoplastic resin, in which the elastic member further includes at least a nonionic surfactant having an ethylene oxide adduct, and the content of the nonionic surfactant is 0.1 to 5 mass % with respect to the styrene-based thermoplastic elastomer. The elastic member has sufficient releasability and high liquid-contact properties, which suppresses clogging of ejection orifices due to precipitation when eluted in ink.

19 Claims, 1 Drawing Sheet

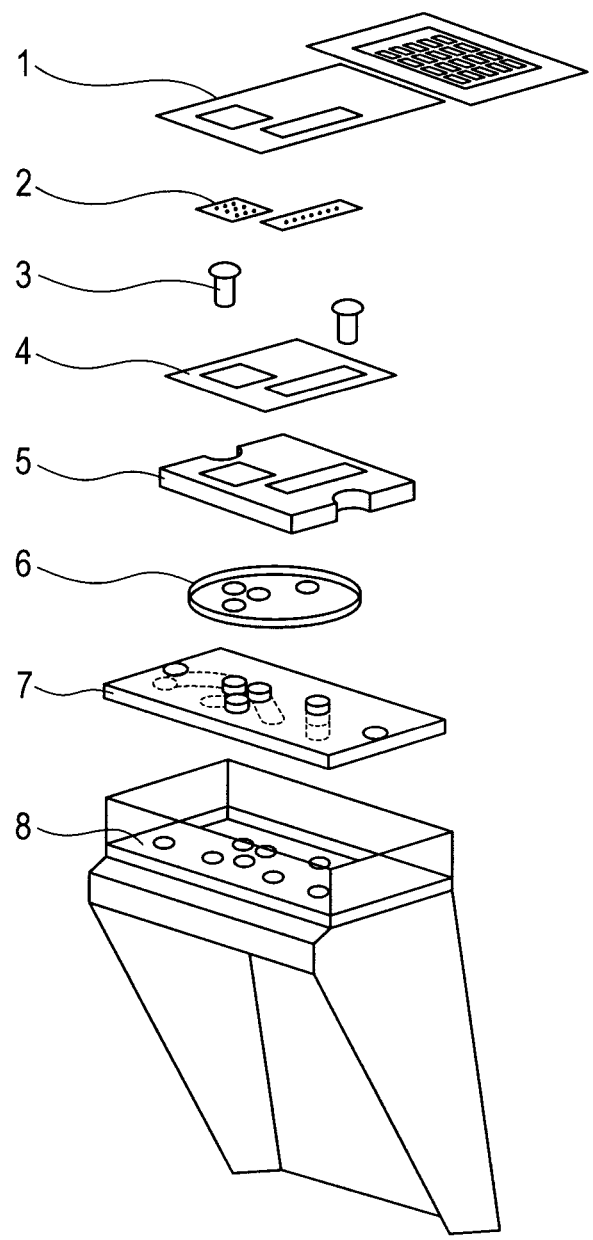

ELASTIC MEMBER FOR INK JET

BACKGROUND OF THE INVENTION

1. Field of the Invention

The present invention relates to an elastic member for ink jet such as an ink seal or a rubber stopper used for an ink storage portion and an ink flow path portion.

2. Description of the Related Art

As an elastic member used for an ink storage portion and an ink flow path of an ink jet recording head, a sealing part or a rubber stopper can be mentioned, for example. As a material for the elastic member, a thermoplastic elastomer is generally used. Further, in an ink jet application, water vapor barrier properties for preventing ink evaporations, air barrier properties for suppressing bubbles from entering, rubber elasticity for and flexibility (low hardness) ensuring sealing properties, and the like are required as disclosed in Japanese Patent Application Laid-Open No. 2005-305878. In addition, the ink jet recording head flies very fine droplets, and hence a nozzle for ejecting ink has a diameter as small as, for example, 10 μm or less in some cases. Therefore, when a foreign material with a size of several μm is discharged from an elastic member that constructs an ink flow path, the foreign material may inhibit ink from being ejected and cause printing failure. Accordingly, a compound that constructs an elastic member for ink jet needs to have liquid-contact properties of being dissolved without causing precipitation even when eluted in ink, and it is necessary to suppress the compound from being discharged as a foreign material without being dissolved in ink to a possible extent.

Further, the thermoplastic elastomer generally has low releasability during injection molding, and hence cannot be molded in some cases due to its unreleasability. Of the thermoplastic elastomers, a material having a low hardness and high barrier properties tends to have particularly low releasability, and hence a thermoplastic elastomer having physical properties required for an ink jet application often has low releasability. Therefore, a release agent is required during molding in most cases. The release agent is broadly classified into an external release agent and an internal release agent. The external release agent is used by being directly applied to a mold. Although it is easy to treat a mold with the external release agent, an effect of the release agent is gradually reduced, and hence it is necessary to apply the release agent every time the effect is reduced. On the other hand, the internal release agent is used by being kneaded into a material in advance. The use of a material blended with the internal release agent has advantages of saving the trouble of application of the release agent to a mold and not causing a reduction in release effect even after repeated molding.

SUMMARY OF THE INVENTION

Ink having zinc stearate, stearic acid amide, or the like eluted therein, which has generally been used as the internal release agent heretofore, involves a problem in that the ink is liable to cause a bleeding phenomenon in which the ink bleeds during recording, resulting in a reduction in printing quality. Therefore, there has been a demand for an internal release agent with satisfactory liquid-contact properties, which may be blended into a thermoplastic elastomer suitable for an ink jet application. An object of the present invention is to provide an elastic member for ink jet, which is satisfactory in releasability and does not cause defects in printing.

An elastic member for ink jet according to the present invention includes: a styrene-based thermoplastic elastomer; and a thermoplastic resin, in which the elastic member further includes at least a nonionic surfactant having an ethylene oxide adduct, and the content of the nonionic surfactant is 0.1 to 5 mass % with respect to the styrene-based thermoplastic elastomer.

According to the present invention, the elastic member for ink jet, which is satisfactory in releasability and does not cause defects in printing, can be provided.

Further features of the present invention will become apparent from the following description of exemplary embodiments with reference to the attached drawing.

BRIEF DESCRIPTION OF THE DRAWINGS

FIGURE is a schematic diagram illustrating a construction of an ink jet recording head including an elastic member for ink jet according to the present invention.

DESCRIPTION OF THE EMBODIMENTS

Preferred embodiments of the present invention will now be described in detail in accordance with the accompanying drawings.

Elastic Member for Ink Jet

An elastic member for ink jet according to the present invention may be used for any of an ink storage portion for storing ink and an ink flow path portion for supplying ink to an ink jet recording head without any particular limitation. Examples of the elastic member for ink jet according to the present invention include an ink seal and a rubber stopper used for an ink jet recording head. Examples of the ink seal include a joint seal 6 of an ink jet recording head as illustrated in FIGURE. The joint seal 6 is disposed between a flow path plate 7 and a chip plate 5, is one of the parts for forming an ink flow path, and needs to have rubber elasticity, barrier properties, and liquid-contact properties. Ink supplied from an ink cartridge passes through an ink flow path formed by welding a chip tank 8 and the flow path plate 7. In addition, the ink passes through an ink flow path provided in each of the joint seal 6 and the chip plate 5, and is finally ejected with heat of a heater provided in a chip 2.

The elastic member for ink jet according to the present invention includes at least a nonionic surfactant having an ethylene oxide adduct, a styrene-based thermoplastic elastomer A, and a thermoplastic resin B.

Styrene-Based Thermoplastic Elastomer A

The elastic member for ink jet according to the present invention includes a styrene-based thermoplastic elastomer A. The "thermoplastic elastomer" as used herein refers to a copolymer having both of a soft segment component having flexibility, such as an isobutylene-based polymer block, and a hard segment component having rigidity and serving as a pseudo crosslinking site, such as a styrene-based polymer block. The thermoplastic elastomer is classified into various series of thermoplastic elastomers such as a styrene-based thermoplastic elastomer, an olefin-based thermoplastic elastomer, a vinyl chloride-based thermoplastic elastomer, a urethane-based thermoplastic elastomer, an ester-based thermoplastic elastomer, an amide-based thermoplastic elastomer, and a silicone-based thermoplastic elastomer. However, the olefin-based thermoplastic elastomer is excellent in water vapor barrier properties but is low in air barrier properties. The vinyl chloride-based thermoplastic elastomer is poor in water vapor barrier properties. The urethane-based thermoplastic elastomer, the ester-based thermoplastic elastomer, and the amide-based thermoplastic elastomer have difficulty in achieving a low hardness, and hence are not suitable for an elastic member for ink jet which needs to have a low hardness such as an ink seal or a rubber stopper. The silicone-based thermoplastic elastomer is very high in flexibility but is very low in both of air barrier properties and water vapor barrier properties, and hence is not suitable for an ink jet application.

In the elastic member for ink jet according to the present invention, there is used, as a base resin, a styrene-based thermoplastic elastomer A, which satisfies properties such as a low hardness, water vapor barrier properties, air barrier properties, and ink resistance required of the elastic member for ink jet in a well-balanced manner, out of the above-mentioned thermoplastic elastomers.

Examples of the styrene-based thermoplastic elastomer A include a styrene-butadiene-styrene block copolymer (SBS), a styrene-isoprene-styrene block copolymer (3-4SIS, 1-2SIS), a styrene-ethylene/butylene-styrene block copolymer (SEBS), a styrene-ethylene/propylene-styrene block copolymer (SEPS), and a styrene-isobutylene-styrene triblock copolymer (SIBS). Of those, SEBS, 3-4SIS, and SIBS each having high barrier properties are preferred because they are particularly suitable for an ink jet application. One kind of those may be used alone, or two or more kinds thereof may be used in combination.

Thermoplastic Resin B

The elastic member for ink jet to be used in the present invention includes a thermoplastic resin B for the purpose of a lubricant for improving injection molding properties. The blending of the thermoplastic resin B can enhance flowability to facilitate molding, and can facilitate solidification at high temperature to shorten the molding cycle. The "thermoplastic resin" as used herein refers to a resin which is softened by being heated to a glass transition temperature or a melting point and can be molded into a desired shape.

Further, the thermoplastic resin B in the present invention is generally a polymer formed of single monomers unlike the thermoplastic elastomer which is a copolymer formed of two or more kinds of monomers of a hard segment and a soft segment as mentioned above. In particular, an olefin-based polymer or a styrene-based polymer having good compatibility with the styrene-based thermoplastic elastomer A is preferably used. For example, polypropylene, polyethylene, polystyrene, and the like are preferably used. One kind of those polymers may be used alone, or two or more kinds thereof may be used in combination. The content of the thermoplastic resin B is preferably 10 to 50 parts by mass with respect to 100 parts by mass of the styrene-based thermoplastic elastomer A. The molding properties are improved by setting the content of the thermoplastic resin B to 10 parts by mass or more. Further, a reduction in rubber elasticity due to an increase in hardness can be suppressed by setting the content of the thermoplastic resin B to 50 parts by mass or less.

Nonionic Surfactant

The elastic member for ink jet according to the present invention includes a nonionic surfactant as an internal release agent.

As mentioned above, the styrene-based thermoplastic elastomer A has low releasability. Further, a hardness required of a sealing member or a rubber stopper for ink jet is as low as 20 to 80 (JIS K6253), and there is such a tendency that a lower hardness leads to lower releasability. Thus, the elastic member for ink jet according to the present invention needs to include a release agent. In addition, among the styrene-based thermoplastic elastomers A, SEBS, 3-4SIS, or SIBS, which has high barrier properties, has particularly low releasability because of strong pressure-sensitive adhesiveness of the material itself, and hence it is essential to use a release agent.

In the present invention, a nonionic surfactant having an ethylene oxide adduct is used as an internal release agent. Such nonionic surfactant having an ethylene oxide adduct improves releasability and simultaneously is dissolved in ink even when eluted in the ink and hence does not precipitate to generate any foreign material which causes the clogging of ejection orifices.

As described above, the inventors of the present invention have found that the nonionic surfactant having an ethylene oxide adduct to be used as an internal release agent does not precipitate in ink to generate any foreign material which causes the clogging of ejection orifices leading to printing failure unlike a conventional internal release agent. In addition, the inventors of the present invention have found that a surfactant having an ethylene oxide adduct exhibits a release effect, and has properties of improving fixability of ink on a recording medium and properties of improving water resistance of ink.

Further, regarding the use of the nonionic surfactant, neutral ink has mainly been used as the ink in recent years, and it can be said that the nonionic surfactant is suitable when such influences on ink as described above are taken into consideration.

In addition, it is preferred to use the same surfactant for a surfactant to be used in the elastic member for ink jet according to the present invention and for a surfactant to be blended in ink.

Examples of the nonionic surfactant having an ethylene oxide adduct in the present invention include an acetylene glycol ethylene oxide adduct, a polyoxyethylene alkyl phenyl ether, and a polyoxyethylene alkyl ether. One kind of those surfactants may be used alone, or two or more kinds thereof may be used in combination. It should be noted that the nonionic surfactant having an ethylene oxide adduct in the present invention is not limited thereto.

In addition, the inventors of the present invention have also found that the use of the elastic member for ink jet according to the present invention can provide a novel effect of reducing bubbles present in an ink flow path as well as both of releasability and liquid-contact properties (properties of having good compatibility with ink when eluted in the ink).

In the ink jet, bubbles present in an ink flow path may cause ejection failure and defects in ink supply. When bubbles caused during filling of ink flow and reach a nozzle directly, the bubbles cause ejection failure and defects in ink supply, and serve as nuclei in the case where air enters from an external environment.

The nonionic surfactant having an ethylene oxide adduct of the present invention easily gets wet with ink because of its small contact angle with the ink based on properties of the surfactant, and hence also has an effect of preventing bubbles from being easily accumulated during filling of ink.

The content of the nonionic surfactant having an ethylene oxide adduct of the present invention is 0.1 to 5.0 parts by mass with respect to 100 parts by mass of the styrene-based thermoplastic elastomer A. When the content is less than 0.1 part by mass, sufficient releasability and effect of reducing an initial bubble amount cannot be provided. On the other hand, when the content is more than 5.0 parts by mass, reductions in rubber elasticity and in barrier properties occur. In addition, the content is more preferably 1.0 to 5.0 parts by mass.

Others

The elastic member for ink jet according to the present invention may include a petroleum-based softening agent or a compound such as paraffin or polybutene serving as a compatibilizer for improving the kneadability of the styrene-based thermoplastic elastomer A with the thermoplastic resin B and as a softening agent for adjusting the hardness.

In particular, polybutene is preferably used because of its high barrier properties. In this regard, however, when the blending amount of the softening agent is too large, reductions in tensile strength and in rubber elasticity may occur, and hence the content is preferably 50 parts by mass or less with respect to 100 parts by mass of the styrene-based thermoplastic elastomer A.

EXAMPLES

Hereinafter, an embodiment of the present invention is described. However, the present invention is not limited thereto.

An elastic member for ink jet according to this embodiment is a joint seal 6 of an ink jet recording head illustrated in FIGURE.

The joint seal 6 according to this embodiment was produced corresponding to each example by mixing a base resin, a lubricant, a softening agent, and an internal release agent at a blending ratio shown in each of Examples 1 to 10 of Table 1, kneading the mixture with a Banbury mixer, pelletizing the kneaded mixture with a pelletizer, and subjecting the pellet to injection molding with an injection molding machine.

Example 1

As shown in Table 1, 3-4SIS [manufactured by KURARAY CO., LTD., trade name: HYBRAR 7311] was used as the base resin. Polyethylene [manufactured by Prime Polymer Co., Ltd., trade name: NEO-ZEX5000SF] was used as the lubricant. Polybutene [manufactured by Idemitsu Kosan Co., Ltd., trade name: HV-300] was used as the softening agent. An acetylene glycol ethylene oxide adduct [manufactured by Kawaken Fine Chemicals Co., Ltd., trade name: Acetylenol E100] was used as the internal release agent.

The thus prepared joint seal 6 of Example 1 was evaluated for its releasability by the following method. A case where the joint seal was released by pushing it out once or twice with an ejector pin (extrusion pin) during molding was defined as "Released" and a case where the joint seal was not released by pushing it out twice was defined as "Not released." Then, the number of the joint seals was counted to calculate a release rate. A case where the release rate is improved by two times or more with respect to the release rate in the case of performing molding using materials not blended with the internal release agent was expressed as "OK" and a case where the release rate is improved by less than two times was expressed as "NG." The ejector pin (extrusion pin) as used herein is a pin integrated into a mold for extruding a molded article from the mold.

I) Liquid-Contact Properties

The liquid-contact properties were evaluated as described below. An ink jet recording head was produced using the produced joint seal 6 and preserved at 70° C. for 1 day. Then, printing was evaluated. Here, a case where printing failure did not occur was expressed as "OK" and a case where printing failure occurred was expressed as "NG."

II) Initial Bubble Amount in Ink Flow Path

The initial bubble amount in an ink flow path was evaluated as described below. An ink jet recording head including the produced joint seal 6 was filled with test ink. Then, the initial bubble amount was confirmed by cross-section observation by X-ray CT.

As compared to an ink jet recording head including the joint seal 6 produced using materials not blended with a nonionic surfactant having an ethylene oxide adduct as the internal release agent, a case where the initial bubble amount was reduced was expressed as "OK" and a case where the initial bubble amount was not reduced was expressed as "NG." It should be noted that the ink used for evaluating examples and comparative examples of the present invention has the following composition.

Composition of Ink

Glycerin: 7.5 mass %, thiodiglycol: 7.5 mass %, Acetylenol E100:1 mass %, pure water: 84 mass %

Further, ink which may be used in the present invention is not limited to the ink having the above-mentioned composition, and ink generally used for ink jet may be used.

III) Molding Properties

The molding properties were evaluated as described below. A pellet was subjected to injection molding with an injection molding machine. Here, a case where injection molding properties were satisfactory was expressed as "OK" and a case where injection molding was difficult was expressed as "NG."

IV) Rubber Elasticity

The rubber elasticity was evaluated as described below. The rubber elasticity of the produced joint seal 6 was compared to that of the joint seal 6 produced using materials not blended with a nonionic surfactant having an ethylene oxide adduct as the internal release agent. Here, a case where a reduction in rubber elasticity did not occur was expressed as "OK" and a case where a reduction in rubber elasticity occurred was expressed as "NG."

The internal release agent used in this evaluation was zinc stearate generally conventionally used as the internal release agent.

Examples 2 to 10 and Comparative Examples 1 to 4

In each of Example 2 to Example 10, a joint seal 6 was produced in the same manner as in Example 1 except for using the respective materials shown in Table 1 and was evaluated for the respective items I) to IV) under the same conditions.

Hereinafter, materials used in each of the examples and comparative examples are described.

As a base resin other than 3-4SIS, there was used SIBS [manufactured by Kaneka Corporation, trade name: SIBSTAR 073T] or SEBS [manufactured by KURARAY CO., LTD., trade name: SEPTON 8007].

As a lubricant other than polyethylene, there was used polypropylene [manufactured by Japan Polypropylene Corporation, trade name: NOVATEC PP BC05B] or polystyrene [manufactured by PS Japan Corporation, trade name: HT478]. As a softening agent other than polybutene, there was used paraffin [manufactured by Nippon Oil Corporation, trade name: Diana Process Oil PW 150]. As an internal release agent other than Acetylenol E100, there was used an ethylene oxide adduct [manufactured by Kawaken Fine Chemicals Co., Ltd., trade name: Acetylenol E300] or zinc stearate [manufactured by NOF CORPORATION, trade name: Zinc Stearate GF-200].

TABLE 1

| | | Ex. 1 | Ex. 2 | Ex. 3 | Ex. 4 | Ex. 5 | Ex. 6 | Ex. 7 | Ex. 8 | Ex. 9 | Ex. 10 | Comp. Ex. 1 | Comp. Ex. 2 | Comp. Ex. 3 | Comp. Ex. 4 |
|---|---|---|---|---|---|---|---|---|---|---|---|---|---|---|---|
| Base resin (TPE) | 3-4SIS | 100 | 100 | 100 | 100 | 100 | | | 100 | 100 | 100 | 100 | 100 | | 100 |
| | SIBS | | | | | | 100 | | | | | | | 100 | |
| | SEBS | | | | | | | 100 | | | | | | | |
| Lubricant | Polypropylene | | | | | 20 | | 20 | 10 | 50 | | 20 | 20 | | |
| | Polyethylene | 20 | 20 | 20 | 20 | | | | | | 20 | | | | |
| | Polystyrene | | | | | | 20 | | | | | | | 20 | |
| Softening agent | Polybutene | 10 | 10 | 10 | 10 | 10 | 10 | 10 | 10 | | | 10 | 10 | 10 | 10 |
| | Paraffin | | | | | | | | | 30 | | | | | |
| Internal release agent | Acetylenol E100 | 1 | 0.1 | 5 | | 1 | 1 | 1 | 1 | 1 | 1 | | 0.01 | 10 | 1 |
| | Acetylenol E300 | | | | 1 | | | | | | | | | | |
| | Zn stearate | | | | | | | | | | | 1 | | | |
| Releasability | | OK | OK | OK | OK | OK | OK | OK | OK | OK | OK | OK | NG | OK | OK |
| Liquid-contact properties | | OK | OK | OK | OK | OK | OK | OK | OK | OK | OK | NG | OK | OK | OK |
| Initial bubble amount in ink flow path | | OK | OK | OK | OK | OK | OK | OK | OK | OK | OK | NG | NG | OK | OK |
| Molding properties | | OK | OK | OK | OK | OK | OK | OK | OK | OK | OK | OK | OK | OK | NG |
| Reduction in rubber elasticity | | OK | OK | OK | OK | OK | OK | OK | OK | OK | OK | OK | OK | NG | OK |

As shown in Table 1, all of Examples 1 to 10 showed satisfactory results in evaluation of the releasability, evaluation of the liquid-contact properties, evaluation of the initial bubble amount, evaluation of molding properties, and evaluation of rubber elasticity.

In Comparative Example 1, in which zinc stearate was used as the internal release agent, printing failure occurred in the evaluation of liquid-contact properties, and there was a problem in terms of liquid-contact properties. Further, also in the evaluation of the initial bubble amount in an ink flow path, the generation of bubbles was remarkable, and ejection failure and defects in ink supply occurred.

In Comparative Example 2, in which the internal release agent was blended in an amount of 0.01 part by mass with respect to 100 parts by mass of the base resin, no effect of improving the release rate was provided in the evaluation of the releasability, and the joint seal was not released by pushing it out once or twice with an ejector pin (extrusion pin).

In Comparative Example 3, in which the internal release agent was blended in an amount of 10 parts by mass with respect to 100 parts by mass of the base resin, the elasticity was excessively reduced in the evaluation of the rubber elasticity, which made it difficult to use the produced joint seal as the joint seal 6.

In Comparative Example 4, in which no lubricant was used, the melt viscosity was high, solidification hardly occurred even at lower temperature, and hence injection molding was difficult in the evaluation of the molding properties.

As described above, according to the elastic member for ink jet according to the present invention, an improvement in releasability and a reduction in initial bubble amount can be achieved while maintaining water vapor barrier properties, air barrier properties, flexibility, and rubber elasticity necessary for an ink jet application.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-260185, filed Nov. 22, 2010, which is hereby incorporated by reference herein in its entirety.

What is claimed is:

1. An elastic member, comprising:
   a styrene-based thermoplastic elastomer; and
   a thermoplastic resin,
   wherein the elastic member further comprises at least a nonionic surfactant having an ethylene oxide adduct, and a content of the nonionic surfactant is 0.1 to 5 mass % with respect to the styrene-based thermoplastic elastomer, and
   wherein the nonionic surfactant comprises an acetylene glycol ethylene oxide adduct.

2. An elastic member according to claim 1, wherein the thermoplastic resin comprises at least either one of an olefin-based polymer and a styrene-based polymer.

3. An elastic member according to claim 1, wherein the styrene-based thermoplastic elastomer comprises a block copolymer of a styrene unit and an isobutylene unit.

4. An elastic member according to claim 1, wherein the thermoplastic resin accounts for 10 to 50 mass % with respect to the styrene-based thermoplastic elastomer.

5. An elastic member according to claim 1, wherein the styrene-based thermoplastic elastomer comprises a styrene-isoprene-styrene block copolymer.

6. An elastic member according to claim 1, wherein the styrene-based thermoplastic elastomer comprises a styrene-ethylene/butylene-styrene block copolymer.

7. An elastic member according to claim 1, wherein the styrene-based thermoplastic elastomer comprises a styrene-isobutylene-styrene triblock copolymer.

8. An elastic member according to claim 1, wherein the elastic member comprising paraffin or polybutene.

9. A member comprising an ink storage portion for storing ink and an elastic member, the elastic member comprising:
   a styrene-based thermoplastic elastomer; and
   a thermoplastic resin,
   wherein the elastic member further comprises at least a nonionic surfactant having an ethylene oxide adduct, and a content of the nonionic surfactant is 0.1 to 5 mass % with respect to the styrene-based thermoplastic elastomer, and
   wherein the nonionic surfactant comprises an acetylene glycol ethylene oxide adduct.

10. A member according to claim 9, wherein the thermoplastic resin comprises at least either one of an olefin-based polymer and a styrene-based polymer.

11. A member according to claim 9, wherein the styrene-based thermoplastic elastomer comprises a block copolymer of a styrene unit and an isobutylene unit.

12. A member according to claim 9, wherein the styrene-based thermoplastic elastomer comprises a block copolymer of a styrene unit and an isobutylene unit.

13. A member according to claim 9, wherein the thermoplastic resin accounts for 10 to 50 mass % with respect to the styrene-based thermoplastic elastomer.

14. A member according to claim 9, wherein the styrene-based thermoplastic elastomer comprises a styrene-isoprene-styrene block copolymer.

15. A member according to claim 9, wherein the styrene-based thermoplastic elastomer comprises a styrene-ethylene/butylene-styrene block copolymer.

16. A member according to claim 9, wherein the styrene-based thermoplastic elastomer comprises a styrene-isobutylene-styrene triblock copolymer.

17. A member according to claim 9, wherein the elastic member comprises paraffin or polybutene.

18. A member according to claim 9, wherein the elastic member is to be in contact with ink.

19. A member according to claim 9, wherein the elastic member is arranged between the ink storage portion and an ink jet recording head.

* * * * *